Dec. 18, 1945.  F. F. DAUENHAUER  2,391,138
STATIONARY TYPE HOP PICKING MACHINE
Filed Dec. 8, 1941  2 Sheets-Sheet 1
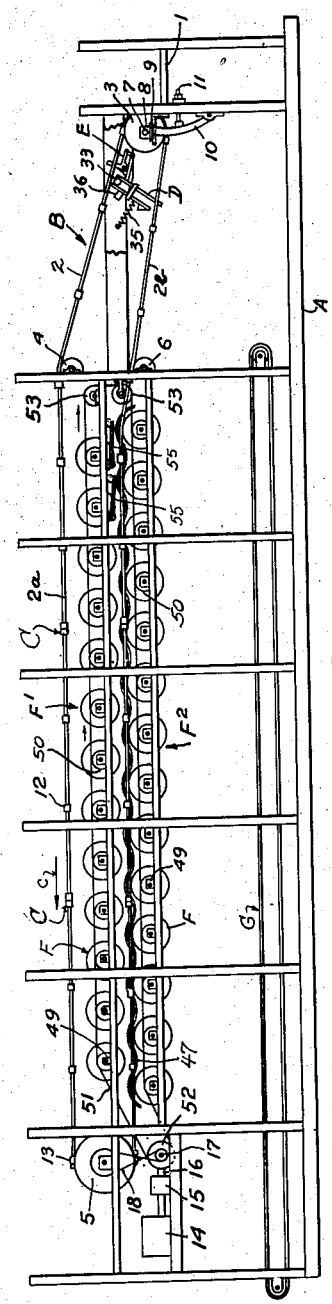
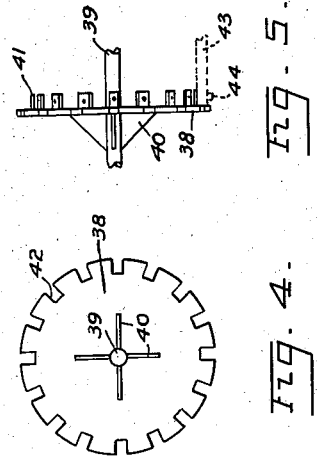
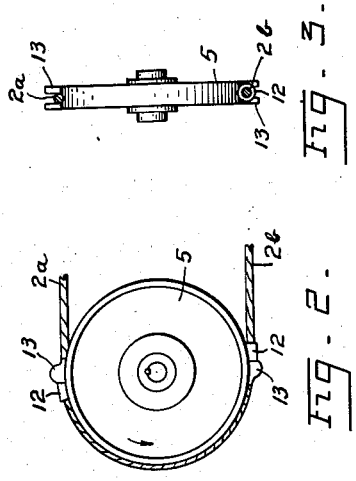
INVENTOR.
FLORIAN F. DAUENHAUER
BY
ATTORNEYS Dec. 18, 1945.  F. F. DAUENHAUER  2,391,138
STATIONARY TYPE HOP PICKING MACHINE
Filed Dec. 8, 1941   2 Sheets-Sheet 2
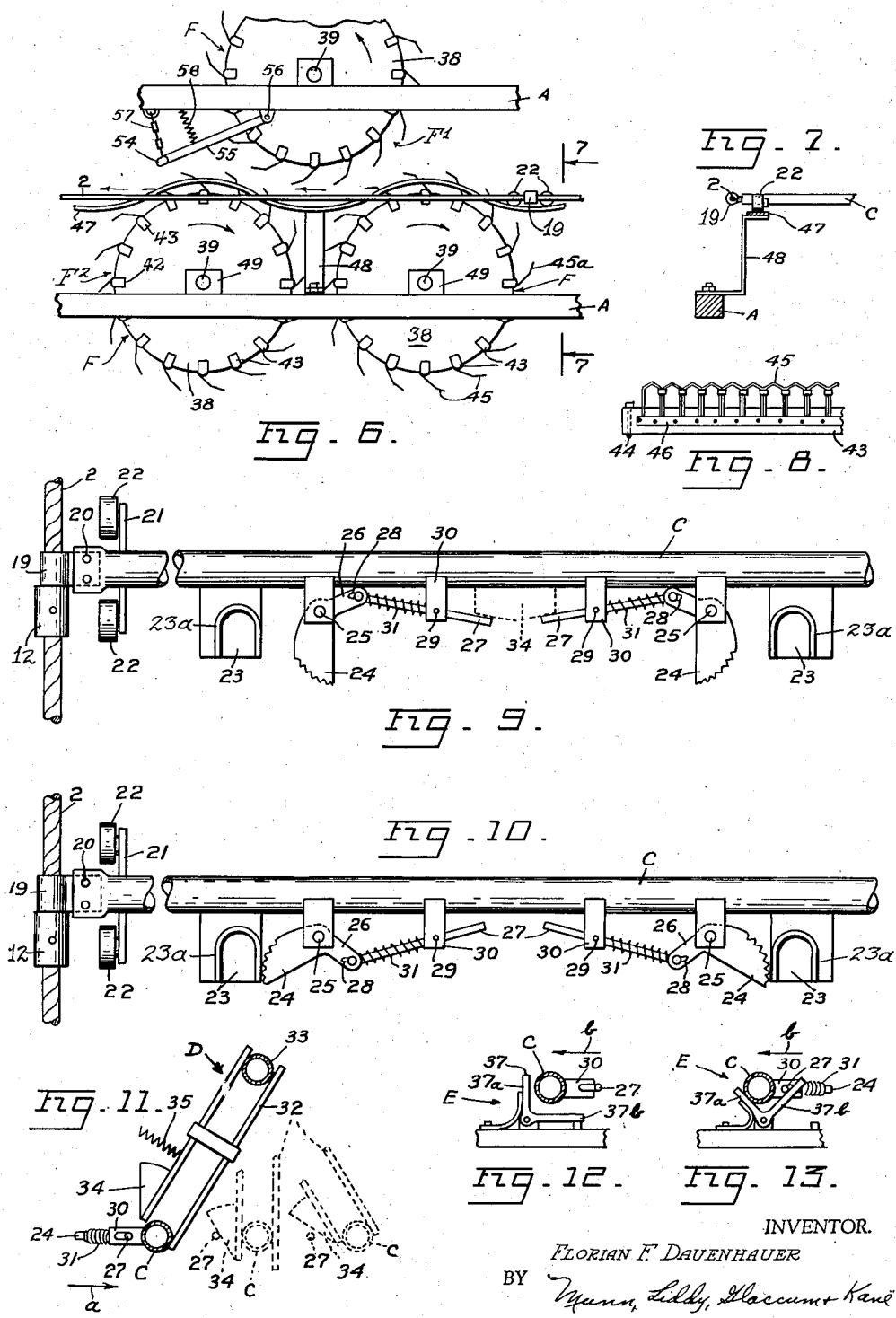
INVENTOR.
FLORIAN F. DAUENHAUER
BY
ATTORNEYS Patented Dec. 18, 1945

2,391,138

UNITED STATES PATENT OFFICE 2,391,138

STATIONARY TYPE HOP PICKING MACHINE

Florian F. Dauenhauer, Santa Rosa, Calif.

Application December 8, 1941, Serial No. 422,049

13 Claims. (Cl. 130—30)

REISSUED
JUN 17 1947

Hops are raised on a trellis sixteen to eighteen feet in height. When ripe, the vines are cut about four feet from the ground, the strings supporting their upper ends to the wire or trellis overhead being either broken by pulling on the vines or cut. Hand picking of hops, owing to the conditions surrounding the growing of hops, the shortness of the season, scarcity of labor and the like, is very expensive and the best hand picking leaves a large percentage of foreign material in the hops and the necessary sacking, boxing and delay in getting hand picked hops to the dry house often results in the discoloring, bruising and flattening of the hops themselves and entails many objectionable incidents.

My invention is an improvement over Patents Nos. 1,054,119 and 1,054,551 covering an apparatus and method for picking hops. In the patents, the picker drums are arranged in two horizontal rows with the drums in the upper row being disposed vertically above the drums in the lower row. The passage between the two rows of drums in the patented devices is therefore restricted in depth between each pair of drums and is of greater depth between adjacent sets of drums. This results in a passage having varying depths and the vines will be unnecessarily compressed each time they are moved through the restricted portions of the passage. The breakage of parts of the vines takes place more readily because of this. Moreover, the arrangement of the drums in vertical pairs leads to another disadvantageous feature of the machine. The hops are picked only where the vertical pairs of drums occur and no picking takes place between adjacent pairs of drums. The picking operation is therefore not continuous throughout the length of the passage.

One of the objects of my invention is to provide a hop picker in which the picking of the hops is continuous throughout the length of the passage through which the vines are moved. A further object of my invention is to provide a passage of uniform depth throughout. A more complete picking of the hops results and there is less breakage of the vines since the vines are carried through a passage of uniform depth rather than through one where the depth varies between each pair of successive drums.

A further object of my invention is to provide a novel vine carrier made of endless cables and carrying vine grasper bars, the bars in turn having vine gripping jaws that are automatically closed on the vines at the feeding end of the machine and are automatically opened so as to free the vines at the exit end of the machine.

The use of cables in place of chains has proved far more satisfactory in operation and is less costly to build. Novel means is used for causing the two cables to move in unison so that the grasper bars will always remain in proper position. I also provide novel means for pressing the vines down upon certain of the hop picking drums in order to insure a complete removal of the hops from the vines.

Other objects and advantages will appear in the following specification, and the novel features of the device will be particularly pointed out in the appended claims.

My invention is illustrated in the accompanying drawings forming a part of this application, in which:

Figure 1 is a side elevation of the entire device, a portion being broken away for clarity;

Figure 2 is a side elevation of a drive pulley for the endless carrier;

Figure 3 is an end view of the drive pulley;

Figure 4 is a plan view of a drum end for the picking drums;

Figure 5 is a side elevation of Figure 4;

Figure 6 is an enlarged detail of the machine showing three of the hop picking drums;

Figure 7 is a section along the line 7—7 of Figure 6;

Figure 8 illustrates the hop picking fingers carried by the drum;

Figure 9 is a plan view of a grasper bar and the vine gripping jaws;

Figure 10 is a view similar to Figure 9 and shows the jaws in closed position;

Figure 11 is a side view of the jaw opening mechanism; and

Figures 12 and 13 are side views of the jaw closing mechanism shown in two positions.

While I have shown only the preferred form of my invention it should be understood that various changes or modifications may be made within the scope of the appended claims without departing from the spirit and scope of the invention.

In carrying out my invention I provide a frame, indicated generally at A. This frame is of considerable size, being approximately seventy five feet long and eighteen feet high, although I do not wish to be confined to any exact measurements. A feed platform 1, see Figure 1, is mounted at the front end of the frame and an endless carrier, indicated generally at B, extends from the feed platform to substantially the rear end of the frame. I will first describe the construction of the carrier.

Endless carrier for vines

The carrier is composed of two endless cables 2 that are passed around a pair of idler pulleys 3 disposed adjacent to the platform 1 and then the upper reach 2a of each endless cable is passed over a second idler pulley 4 and thence around a drive pulley 5 disposed near the rear end of the machine. The lower reach 2b of the endless cable extends from the drive pulley 5, over an idler pulley 6, and back to the front idler pulley 3. The pulleys 3 are mounted on a shaft 7 that is supported in bearings 8 that slide on brackets 9 or other suitable supports. A leaf spring 10 is connected to each bearing 8 and tends to move the bearings and pulleys 3 to the right in Figure 1 for automatically taking up any slack in the carrier. An adjusting bolt 11 is used for varying the tension of each spring 10, and the springs in turn will hold the proper tension on each endless cable 2.

Knobs 12 are secured to the cables and are spaced at equal intervals along both cables. One of the drive pulleys 5 is shown in detail in Figures 2 and 3, and it will be noted that the periphery of the pulley carries outwardly extending U-shaped members 13 or knob gripping means. The cable is received between the arms of the U-shaped members and the knobs are too large to pass through the space provided between the arms. The result is that as the drive pulley rotates counter-clockwise in Figure 2, the U-shaped members 13 will contact with the knobs 12 and carry them around the drive pulley and thus move the cables. The carrier is moved by the pulleys 5 and the two endless cables are kept in synchrony with each other by the members 13 engaging the knobs 12. Any means for rotating the drive pulleys 5 may be resorted to and I have shown a motor diagrammatically at 14, a clutch 15 operated by the motor, and a shaft 16 extending from the clutch and in turn rotating a shaft 17 that extends at right angles to the shaft 16. The shaft 17 is operatively connected to the drive pulley 5 by a chain and sprocket, indicated generally at 18. Any other driving means may be resorted to if desired. So far as I am aware, the use of cables 2 in place of chains in the vine grasper assembly, is entirely new and has proved far more satisfactory in operation and less costly to build. When chains are used, the sprockets keep the two chains moving in synchrony. In using two cables in place of chains, I have solved the problem of moving the cables in synchrony by providing knobs on the cables and U-shaped members 13 on the pulleys 5 for causing the knobs 12 to be moved by the members 13.

The carrier is designed to support vines and move them from one end of the machine to the other and then back to the front end while hop picking drums engage with the vines and remove the hops therefrom. It is best to describe the vine gripping means and then to set forth the particular construction of the hop picking drums.

Vine gripping means

In Figures 9 and 10, I show one of the endless cables 2 and indicate how a vine grasper bar C is secured to the cables. The bar is preferably hollow and has its ends flattened. A strap 19 is passed around the cable 2 and has its free ends inserted into the slot formed by the flattened end of the bar, the ends being secured to the bar by rivets 20. The strap 19 bears against one of the knobs 12 and the knobs move the bars along with the cables. Although Figures 9 and 10 show only one of the cables 2 and the manner of connecting the bar to the cable, the other cable is connected to the other bar end in the same manner. The bar has a carriage 21 secured thereto at each end, and rollers 22 are mounted on the carriage and are designed to ride on an undulating track hereinafter described. The cables 2 are moved in synchrony with each other, and this will cause the grasper bars C to remain parallel with each other at all times. The cables 2 are free to rotate in the straps 19 in which they are loosely received. In actual service, the cables rotate within the straps at a uniform speed directly in proportion to the travel of the cables over the pulleys. The wear on the cables is thus evenly distributed over the entire surface of the cable resulting in a much longer wear.

The vine gripping jaws are shown in open position in Figure 9 and in closed position in Figure 10. Stationary jaws 23 are secured to the bar C and swingable jaws 24 are pivoted at 25 so as to be moved against the stationary jaws 23. The jaws 24 carry arms 26 and the arms are connected to levers 27, the levers being received in slots 28 in the arms. The levers in turn are pivoted at 29 to supports 30 that are carried by the bar C. A coiled spring 31 bears against the support 30 and against the arm 26.

The construction is such that the swingable jaws 24 and the levers 27 may be swung beyond dead center in either direction and in one position will hold the jaws closed and in the other position will hold the jaws open. Figures 1, 9 and 11 show the jaw opening mechanism, indicated generally at D. The bar C is moved to the right along the lower reach 2b of the endless cable, see arrow a in Figure 11, and the bar engages with an arm 32 of the jaw opening mechanism D that is pivotally secured at 33 to the frame A. As the bar C moves to the right in Figure 11, the arm 32 will be swung counter-clockwise and will force a cam 34 down between the bar C and the free ends of the levers 27. The arm 32 and cam 34 are placed midway between the sides of the machine. As the cam is moved it will swing the levers beyond dead center (note the center dotted line position in Figure 11) and the jaws will be held in open position thereafter by the springs 31. The cam 34 is shown in dotted lines in Figure 9. When the bar C reaches the second dotted line position, shown in Figure 11, it will start to retract from the bar C and the levers 27. A spring 35, see Figure 1, will return the arm 32 back to normal position, and a stop 36 will hold the arm in a position where it will be engaged by the next bar C.

The jaws will remain in open position during the movement of the bar C from the jaw opening mechanism D to a jaw-closing mechanism, indicated generally at E in Figures 12 and 13. Bell crank levers 37 are placed in the path of the bars C and the levers 27. A spring 38 normally holds each bell crank lever in the position shown in Figure 12. The bar C will engage with the levers 37 when it is moving along the upper reach 2a of the endless cable and therefore the bar will be moving in the direction of the arrows b shown in Figures 12 and 13. The bar C will move one leg 37a of each bell crank lever 37 and this will cause the other leg 37b to engage with its lever 27 and to swing it toward the bar C. When the lever 27 passes dead center position, it will swing the jaw 24 against the jaw 23. The bell crank lever 27 will permit the bar C and the closed jaw to pass and as soon as the bar has freed the bell crank lever, the spring 38 will return it to normal position shown in Figure 12. The jaw closure will now be ready for the next bar C and the swinging jaws 24 carried by the bar.

The closing of the jaws by the jaw closing mechanism E will cause them to grip vines that are fed from the platform 1 and placed in the space between the cables 2. The vines will be moved along the top reach 2a over picking drums F which will now be described.

Hop picking drums

Two rows F1 and F2 of picking drums F are provided and extend substantially throughout the length of the machine. The drums F in each row are identical and therefore a description of one will suffice. In Figure 4 a drum end 38 is illustrated. The end is in the shape of a disc and is mounted upon an axle 39. Reinforcing webs 40 extend from the axle to the disc and hold the drum end or head in a plane at right angles to the axle axis. Around the periphery of the drum, radially extending cuts are made and these extend inwardly a predetermined distance. The cut out portions form flanges 41 that are bent inwardly so as to extend at right angles to the plane of the drum head. Both drum heads are formed in the same manner, and recesses 42 are provided around the peripheries by the downturned flanges.

Finger carrying bars 43 of the type shown in Figure 8 have their ends received in the recesses or sockets 42, and the ends rest on the flanges 41. Bolts 44 are passed through openings in the bar ends and are also passed through openings in the flanges. Nuts secure the bolts in place and in this manner the spaced bars 43 constitute the periphery of the cylinder. The bolts 44 need not be U-bolts, but may merely be straight bolts and secure the bars in place in the manner indicated.

Each bar carries a plurality of picking fingers, indicated generally at 45 in Figure 8. The fingers may be made of any material desired, and I have shown wires bent into U-portions and secured to the bar by a strip 46. The U-portions of the wires are preferably V-shaped, see Figure 8, and are bent at an angle as shown at 45a in Figure 6. The drums in the lower row F2 in Figures 1 and 6 rotate in a counter-clockwise direction, while the drums in the upper row F1 rotate in a clockwise direction. The fingers are so inclined as to move into the vines to remove hops therefrom.

The drums in the two rows are arranged to form an undulating passage for vines therebetween and to accomplish this, the drums in the lower row F2 are staggered with respect to those in the upper row F1, and the drums in the lower row are disposed midway between the drums in the upper row. The distance between the two rows of drums is such as to provide a space or passage that will be corrugated in shape and of substantially the same depth throughout. This will cause the vines which are moved between the two rows of drums to follow an undulating path. Since the path has the same depth throughout its length, I have found that it will give a distinct advantage to the picking drums for two reasons. In the first place, the vines will not be periodically squeezed through restricted portions of the passage as they pass therealong, and therefore they will not have a tendency to break because they are not periodically squeezed. In the second place, the staggering of the drums will cause the teeth or fingers to move against the vines continuously throughout the length of the passage and this will remove more hops than would otherwise be possible.

After the vines have been grasped by the jaws 23 and 24, they are moved along over the tops of the upper row F1 of drums and will be dragged over the fingers 45 of these drums. The drum fingers will remove what hops there are on the under side of the vines. When the vines reach the rear of the machine, they will be reversed in their movement and now will be carried between the two rows of drums and along the undulating path or passage formed thereby.

The grasper bars C are moved in an undulating path coinciding with that which is provided between the two rows of drums in order that the bars will not strike the drums. To accomplish this I provide two parallel tracks 47 that are corrugated in accordance with the shape of the undulating passage and are secured to the frame A by supports 48. Figure 7 illustrates how the frame A extends along the side of the track 47 and shows how the rollers 22 ride on the track so as to cause the grasper bar C to move in an undulating path. The tracks are placed between the frame A and the ends of the drums F. The rollers will move the bars C in an undulating manner which will cause the vines to follow the same undulating path formed by the two rows of drums. It will be seen that the fingers on the drums will engage with both sides of the vines to remove hops therefrom as the vines move between the drum rows. It will be practically a continuous engagement of the fingers with the vines throughout the length of the machine due to the fact that the drums are staggered. Where the fingers of one drum leave off, the fingers on the next drum will take over. The hops removed by the fingers will drop down upon a conveyer belt, indicated generally at G, and will be conveyed to the front or rear of the machine as desired. Baffles (not shown) may be placed on the inner sides of the frame and inclined for directing the hops down upon the conveyer belt.

The drums have their shafts 39 rotatably mounted in bearings 49, and these bearings in turn are carried by the frame A. Sprockets 50 are also secured to the shafts and are engaged by a sprocket chain 51 that extends along the upper and the lower row of drums and is driven by a main drive sprocket 52 which is mounted on the shaft 17. At the front end of the machine the sprocket chain 51 is passed over idler sprockets 53. The movement of the sprocket chain is such that the drums and fingers will rotate in a direction opposite to the movement of the vines. For example, the vines when moved by the reach 2a of the carrier will be moved to the left in Figure 1, as shown by the arrow c. The upper row of drums F1 will rotate clockwise in order to engage with the vines in a movement reverse to the moving vines for removing hops therefrom. These hops will drop down upon the conveyer G. During the return movement of the vines through the undulating passage between the two rows of rollers, the movement will be to the right in Figure 1. Here the clockwise rotation of the upper row F1 of drums and the counter-clockwise rotation of the lower row F2 of drums will cause the fingers in both rows to move contrary to the movement of the vines. The fingers will remove hops from the top and bottom of the layer of vines.

In order to insure a more complete removal of the hops from the vines, I have provided two pressure bars 54, see Figure 6, which are placed above the two lower drums that are disposed nearest the front of the machine. Each pressure bar is identical in construction. The pressure bar 54 is carried by two arms 55 which in turn are pivoted to the frame A at 56. Two chains 57 limit the downward movement of the arms, and two springs 58 urge the arms and the pressure bar downwardly against the two drums in the lower row F1, see Figure 1 as well as Figure 6. The vines will be carried under the two pressure bars 54 and will be yieldingly held against the lower drums so that all of the hops will be removed therefrom. The vines when carried free of the drums by the reach 2b will be freed from the carrier B by the jaw release mechanism D, shown in Figure 11 and already described. If desired, a conveyer (not shown) may be used for receiving the hop vines freed from the carrier B and will convey the vines away from the machine.

The stationary jaws 23 have U-shaped portions 23a secured thereto, see Figures 9 and 10. The vines are wrapped around these stationary jaw portions 23a when the movable jaws 24 are in open position. The butt end of the vine is looped around the curved portion 23a of the stationary jaw and the operator can use two hands to accomplish this looping operation because the movable jaw is closed automatically against the stationary jaw and grips the butt end of the vine therebetween after the vine has been placed in position by the operator. The jaw closing means is spaced far enough from the loading platform 1 to permit the vines to be looped around the curved portions 23a before the jaws 24 swing into closed position.

Although I disclose and describe a stationary hop picking machine, it is obvious that the frame A could be made portable so as to be moved from place to place.

I claim:

1. In a hop-picking machine, a plurality of picking drums arranged in two substantially parallel rows, the drums in one row being staggered with respect to those in the other row and the vertical distance between the plane of the axes of the drums in one row and the plane of the axes of the drums of the other row being less than the diameters of the drums so that an undulating path of substantial equal depth throughout is formed therebetween, and means for moving vines between the two rows of picking drums, the drums causing the vines to follow the undulating path, and hop-picking means on the drums for removing hops from the vines as they pass between the two rows of drums, the staggering of the drums causing the hop picking means to remove hops continuously from the vines at the top and bottom of the path throughout the entire length of the path.

2. In a hop-picking machine, a plurality of picking drums arranged in two substantially parallel rows, the drums in one row being staggered with respect to those in the other row to form an undulating path between the two drum rows of substantial equal depth throughout, an undulating track conforming to the undulating path, means movable along the track for moving vines along the undulating path, and hop-picking means carried by the drums for removing hops from the vines as they pass between the two rows of drums.

3. In a hop-picking machine, a plurality of picking drums arranged in two substantially parallel rows, the drums in one row being staggered with respect to those in the other row to form an undulating path between the two drums of substantial equal depth throughout, an undulating track conforming to the undulating path, vine grasper bars movable along the track for pulling vines in a weavy motion between the drums, and hop-picking means carried by the drum for removing hops from the vines.

4. In a hop-picking machine, a pair of endless wire cables, pulleys carrying the cables and supporting them in parallel relation, vine grasper bars extending between the cables and being slidably carried thereby, knobs spaced along the cables and rigidly secured to the cables, the knobs in one cable being aligned with those in the other, certain of the knobs contacting with the bars for moving them, and knob-engaging members on the pulleys, the knobs on the cables and the members on the pulleys being disposed close enough together so that at least one member is engaging with a knob at all times, whereby a synchronous rotation of the pulleys will cause the cables to move in synchrony and maintain the vine grasper bars in proper position.

5. A hop-picking machine comprising an endless carrier, vine gripping means supported by the carrier, a plurality of hop picking drums arranged in two horizontal rows, the drums in the lower row being staggered with respect to those in the upper row to form an undulating passage for the vines, said carrier and vine gripping means moving one side of the vines over the tops of the upper row of drums from one end to the other and then moving the vines between the rollers back to front of the machine, undulating tracks for causing the vine gripping means to weave the vines along the undulating passage between the drums, automatic means for causing the vine gripping means to grip the vines at the front of the machine, and automatic means for causing the vine gripping means to free the vines after the vines have been entirely moved through the undulating passage.

6. In a hop picking machine, a vine grasper bar, means for moving the bar along a path, stationary and cooperating swingable vine-gripping members carried by the bar, levers pivotally carried by the bar and being operatively connected to the swinging members and having their free ends swingable toward the bar for moving the members into vine-gripping position and swingable away from the bar for moving the members into vine-releasing position, spring means for yieldingly holding the levers and members in the positions into which they have been swung, bellcrank levers placed in the path of the moving bars and having their pivoted axes extending at right angles to the path of movement of the bar, one leg of each bell-crank lever being actuated each time a bar moves thereby and causing the other leg to engage and move the free end of its associate lever toward the bar for moving the swinging member into vine-gripping position with its stationary member.

7. In a hop picking machine, a vine grasper bar, means for moving the bar along a path, stationary and cooperating swingable vine-gripping members carried by the bar, levers pivotally carried by the bar and being operatively connected to the swinging members and having their free ends swingable toward the bar for moving the members into vine-gripping position and swingable away from the bar for moving the members into vine-releasing position, spring means for yieldingly holding the levers and members in the positions into which they have been swung, a swinging U-shaped arm placed in the path of the moving bars and having its pivotal axis extending at right angles to the path of movement of the bar, one side of the arm being contacted and moved each time a bar moves thereby, the other side of the U-shaped arm also being moved and carrying a cam that is forced between the bar and the free ends of the levers for swinging the levers and the swingable members into open position.

8. In a hop picking machine, vine grasper bars, means for moving the bars along a path, stationary and cooperating swingable vine-gripping members carried by the bar, levers pivotally carried by the bars and being operatively connected to the swinging members and having their free ends swingable toward the bar for moving the members into vine-gripping position and swingable away from the bar for moving the members into vine-releasing position, spring means for yieldingly holding the levers and members in the positions into which they have been swung, spring-pressed bell-crank levers placed in the path of the moving bars and having their pivotal axes extending at right angles to the path of movement of the bars, one leg of each bell-crank lever being actuated each time a bar moves thereby and causing the other leg to engage and move the free end of its associate lever toward the bar for moving the swinging member into vine-gripping position with its stationary member, said spring pressed bell-crank levers returning to inital positions after the bar has passed, a spring pressed U-shaped arm also placed in the path of the moving bars and having its pivotal axis extending at right angles to the path of movement of the bars, one side of the arm being contacted and moved each time a bar moves thereby, the other side of the U-shaped arm also being moved and carrying a cam that is forced between the bar and the free ends of the levers for swinging the levers and the swingable members into open position, said spring pressed U-shaped arm returning to initial position after each bar passes.

9. In a hop-picking machine, a plurality of hop-picking drums arranged in two rows with a number of drums in each row, the drums in one row being spaced longitudinally from the drums in the other row and the planes of the drum axes of the two rows being spaced apart a distance less than the diameters of the drums to form an undulating path of substantially uniform depth therebetween, and means for moving hop vines in a weavy motion identical to the course of the undulating path for aiding the vines in following the undulating path.

10. In a hop-picking machine, a plurality of hop-picking drums arranged in two rows with a number of drums in each row, the drums in one row being spaced longitudinally from the drums in the other row and the planes of the drum axes of the two rows being spaced apart a distance less than the diameters of the drums to form an undulating path of substantially uniform depth therebetween, means for moving hop vines in a weavy motion identical to the course of the undulating path for aiding the vines in following the undulating path, and means for picking the hops as they move along the path.

11. In a hop-picking machine, a plurality of picking drums, a plurality of vine grasper bars for moving vines past the drums, endless wire cables for moving the bars, said bars being slidably secured to the cables at spaced points and extending transversely between the cables, pulleys supporting the cables, projections spaced along the cables and rigidly secured thereto, certain of the projections contacting with the bars for moving them, and certain of the pulleys having cooperating projections for engaging with the cable projections for moving the cables in unison for maintaining the bars at the proper angle with respect to the cables at all times.

12. In a hop-picking machine, a plurality of picking drums arranged in two spaced rows and staggered so as to provide an undulating path therebetween of uniform depth, a plurality of vine grasper bars for moving vines between the drums, endless cables for moving the bars, means for moving the cables in synchrony with each other, said bars being secured to the cables at spaced points, an undulating track for supporting the bars, the undulations coinciding with the undulations of the path, and rollers secured to the bars and riding on the undulating track for aiding in moving the hop vines through the undulating path.

13. The herein described method of removing hops from vines which consists in moving the vines along an undulating space having a substantial uniform depth and width throughout for causing the vines to undulate as they move while being confined within and extending lengthwise of the space and thus pass through a plurality of arcs to be bent in their travel to aid in exposing the hops to be picked by the continual weaving of the vines as they are moved, and in continually removing hops from the series of arced portions of the layer of vines as they are moved along the entire length of the undulating space.

FLORIAN F. DAUENHAUER.